(12) United States Patent
Zhu et al.

(10) Patent No.: US 12,503,008 B2
(45) Date of Patent: Dec. 23, 2025

(54) CONTROL AND MONITORING OF VEHICLE BATTERY BASED ON COULOMBIC EFFICIENCY RATIO

(71) Applicant: GM GLOBAL TECHNOLOGY OPERATIONS LLC, Detroit, MI (US)

(72) Inventors: Yongjie Zhu, Troy, MI (US); Meng Jiang, Rochester Hills, MI (US); Andrew C. Baughman, Northville, MI (US); Xueyu Zhang, Northville, MI (US); Chunhao J. Lee, Troy, MI (US); Yue-Yun Wang, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 203 days.

(21) Appl. No.: 18/493,916

(22) Filed: Oct. 25, 2023

(65) Prior Publication Data

US 2025/0135946 A1     May 1, 2025

(51) Int. Cl.
    *B60L 58/13*     (2019.01)
    *B60L 3/00*     (2019.01)
    *B60L 53/62*     (2019.01)
    *G01R 31/392*     (2019.01)
    *G01R 31/52*     (2020.01)

(52) U.S. Cl.
    CPC ........... *B60L 58/13* (2019.02); *B60L 3/0046* (2013.01); *B60L 53/62* (2019.02); *G01R 31/392* (2019.01); *G01R 31/52* (2020.01)

(58) Field of Classification Search
    CPC ........ B60L 58/13; B60L 53/62; B60L 3/0046; G01R 31/392; G01R 31/52
    See application file for complete search history.

(56) References Cited

U.S. PATENT DOCUMENTS

| | | | | |
|---|---|---|---|---|
| 4,047,235 A | * | 9/1977 | Davis | H02H 7/12 363/51 |
| 5,666,040 A | * | 9/1997 | Bourbeau | H01M 10/4257 320/147 |
| 5,705,929 A | * | 1/1998 | Caravello | G01R 31/389 324/430 |
| 7,928,735 B2 | * | 4/2011 | Huang | B60L 58/15 324/426 |
| 9,606,520 B2 | * | 3/2017 | Noboa | G05B 23/0235 |

* cited by examiner

*Primary Examiner* — Gertrude Arthur Jeanglaude
(74) *Attorney, Agent, or Firm* — Quinn IP Law

(57) ABSTRACT

A method for monitoring a battery module in a vehicle includes selecting an upper cut-off voltage and a lower cut-off voltage for the battery module. The method includes charging the battery cell from an original state to a first benchmark voltage greater than an upper cut-off voltage, via a first charging process. The method includes discharging the battery cell from the first benchmark voltage to a second benchmark voltage less than a lower cut-off voltage, via a first discharging process. The battery module is then charged from the second benchmark voltage to the first benchmark voltage, via a second charging process. The method includes obtaining a ratio of a discharging capacity to a charging capacity of the battery module. Operation of the vehicle is controlled based in part on the ratio, including taking at least one remedial action if the ratio is less than a predefined threshold.

20 Claims, 3 Drawing Sheets

CONTROL AND MONITORING OF VEHICLE BATTERY BASED ON COULOMBIC EFFICIENCY RATIO

INTRODUCTION

The present disclosure relates to monitoring and control of a vehicle battery based on a coulombic efficiency ratio. The use of mobile platforms employing a rechargeable energy source, both as an exclusive source of energy and a non-exclusive source of energy, has greatly increased over the last few years. A rechargeable energy storage device with battery packs may store and release electrochemical energy as needed during a given operating mode. The electrochemical energy may be employed for propulsion, heating or cooling a cabin compartment, powering vehicle accessories and other uses. The various cells in the battery packs may be characterized by different power, state of charge and capacity rates. It is challenging for battery monitoring systems to accommodate diverse aging mechanisms, complex operating conditions, and the cell-to-cell variation in the battery pack.

SUMMARY

Disclosed herein is a method for monitoring a battery module in a vehicle having a controller with a processor and tangible, non-transitory memory. The method includes selecting an upper cut-off voltage and a lower cut-off voltage. The method includes charging the battery module from an original state to a first benchmark voltage, via a first charging process. The first benchmark voltage is greater than the upper cut-off voltage. The method includes discharging the battery module from the first benchmark voltage to a second benchmark voltage, via a first discharging process. The second benchmark voltage is less than the lower cut-off voltage.

The method further includes charging the battery module from the second benchmark voltage to the first benchmark voltage, via a second charging process. The controller is adapted to determining a discharging capacity and a charging capacity of the battery module based in part on the first discharging process and the second charging process, respectively. The method includes obtaining a ratio of the discharging capacity to the charging capacity, via the controller. Operation of the vehicle is controlled based in part on the ratio, including taking at least one remedial action if the ratio is less than a predefined threshold.

In some embodiments, the method includes selecting the first benchmark voltage ($V_1$) to be about 1 percent greater than the upper cut-off voltage ($V_U$) such that ($V_1=1.01*V_U$). The method may include selecting the second benchmark voltage ($V_2$) to be about 99 percent of the lower cut-off voltage ($V_L$) such that ($V_2=0.99*V_L$). The first discharging process employs a first current for a first duration, while the second charging process uses a second current for a second duration. The second current may be selected to be equal to the first current for efficient calculation.

The upper cut-off voltage and the lower cut-off voltage respectively correspond to an upper state of charge and a lower state of charge. In one example, the lower state of charge is selected to be 5 percent less than the upper state of charge. The method may include selecting the at least one remedial action to include messaging service personnel and/or fleet manager.

In some embodiments, the first discharging process and the second charging process are repeated for at least three respective cycles. The method may include modifying the ratio to be an average of the discharging capacity divided by the charging capacity for the at least three respective cycles.

The method may include diagnosing an internal-short malfunction when the ratio is less than the predefined threshold, and a voltage-based power capability is within an acceptable range. A non-internal-short malfunction is diagnosed when the ratio is less than the predefined threshold, and the voltage-based power capability is outside the acceptable range.

The method may include executing the first discharging process through a vehicle-to-grid connection and/or a vehicle-to-vehicle connection. The first discharging process and the second charging process may be executed while the vehicle is in a parking mode. The first discharging process and the second charging process may be executed while the vehicle is in a driving mode.

The above features and advantages and other features and advantages of the present disclosure are readily apparent from the following detailed description of the best modes for carrying out the disclosure when taken in connection with the accompanying drawings.

Figure 1:
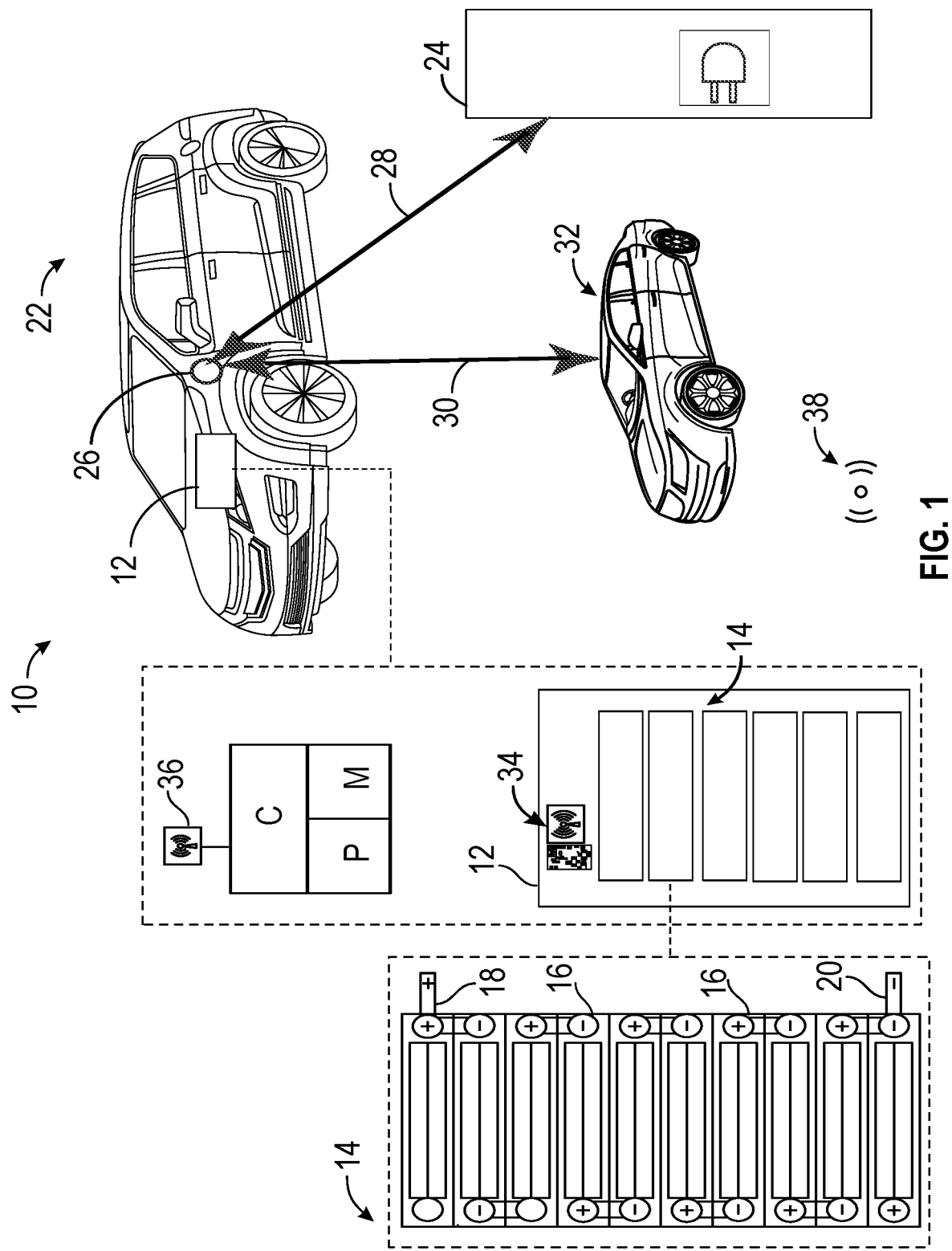
FIG. 1 is a schematic diagram of a system for monitoring a battery module, the system having a controller.

Representative embodiments of this disclosure are shown by way of non-limiting example in the drawings and are described in additional detail below. It should be understood, however, that the novel aspects of this disclosure are not limited to the particular forms illustrated in the above-enumerated drawings. Rather, the disclosure is to cover modifications, equivalents, combinations, sub-combinations, permutations, groupings, and alternatives falling within the scope of this disclosure as encompassed, for instance, by the appended claims.

DETAILED DESCRIPTION

Referring to the drawings, wherein like reference numbers refer to like components, FIG. 1 schematically illustrates a system 10 for monitoring a battery pack 12 having one or more battery modules 14. Each of the battery modules 14 respectively include battery cells 16 connected for current flow between a first terminal 18 and a second terminal 20. The battery cells 16 may have different chemistries, including but not limited to, lithium-ion, lithium-iron, nickel metal hydride and lead acid batteries. It is understood that the number of battery cells in each module and the number of modules in the battery pack 12 may be varied based on the application at hand.

The battery pack 12 may be part of a rechargeable energy storage device for powering a vehicle 22. The vehicle 22 may be partially electric or fully electric. The vehicle 22 may be a mobile platform, such as, but not limited to, a passenger vehicle, sport utility vehicle, light truck, heavy duty vehicle, ATV, minivan, bus, transit vehicle, bicycle, moving robot, farm implement (e.g., tractor), sports-related equipment (e.g., golf cart), boat, plane and train. It is to be understood that the vehicle 22 may take many different forms and have additional components.

Referring to FIG. 1, the vehicle 22 may undergo a direct current (DC) fast-charging operation in which the battery pack 12 is electrically connected to an off-board DC fast-charging station 24, through a vehicle charging port 26. The battery pack 12 may be charged (or discharged) using a vehicle-to-grid connection 28 through the off-board DC fast-charging station 24. In some embodiments, the battery pack 12 may be charged (or discharged) through a vehicle-to-vehicle connection 30 to a secondary vehicle 32.

Referring to FIG. 1, the system 10 includes a controller C with at least one processor P and at least one memory M (or non-transitory, tangible computer readable storage medium) on which instructions are recorded for executing a method 100 for monitoring a unit (e.g., a cell group or module) in the battery pack 12. Method 100 is described below with respect to FIG. 2. The method 100 may be performed at the cell group or module level, which includes one or more battery cells 16 electrically connected in parallel. However, it is understood that the method 100 may be carried out at the level of a battery cell 16 and/or the battery pack 12. The memory M can store executable instruction sets, and the processor P can execute the instruction sets stored in the memory M.

Figure 3:
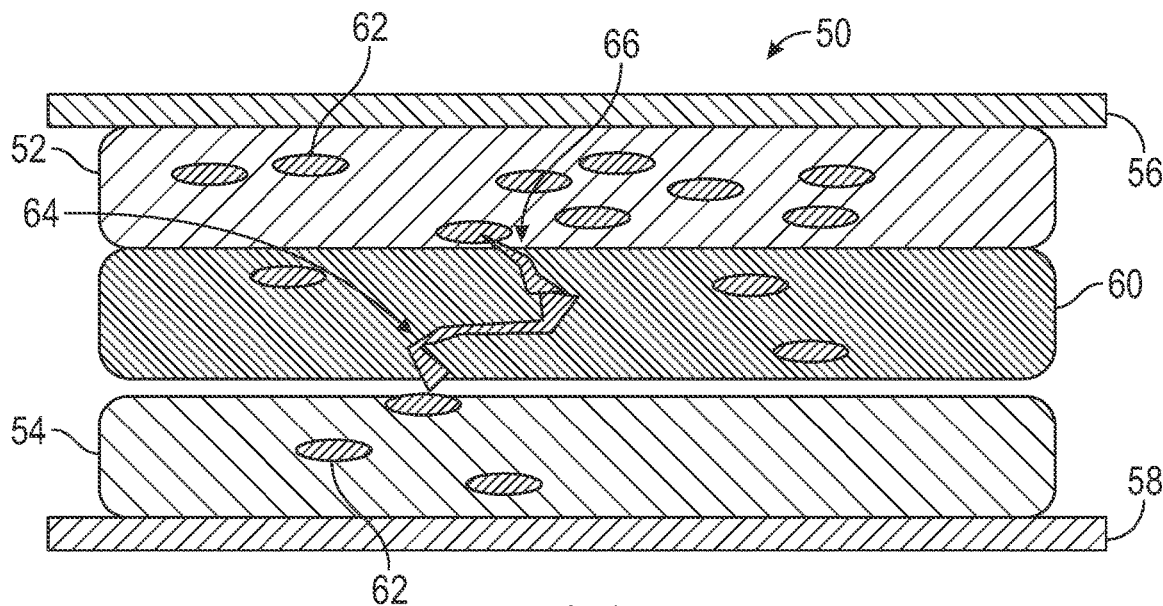
FIG. 3 is a schematic diagram illustrating a soft internal short circuit in a battery.

As described below, the system 10 uses battery parameters obtained during specific charging and discharging modes to calculate a coulombic efficiency ratio for early detection and control of battery issues, such as a soft internal short circuit. Referring to FIG. 3, a soft internal short circuit in a battery cell 50 is illustrated. The battery cell 50 includes an anode 52 and a cathode 54, arranged between a first current collector 56 and a second current collector 58. A separator 60 is sandwiched between the anode 52 and the cathode 54.

Referring to FIG. 3, during the charging process, lithium ions 62 migrate from the cathode 54 to the anode 52, through the separator 60. During the discharging process, the reverse occurs such that the lithium ions 62 migrate from the anode 52 to the cathode 54. For a number of reasons including battery aging, dendrites 64 may form in the pores of the separator 60. The dendrites 64 grow during charging and shorten during discharging. The battery cell 50 may continue to perform as expected in terms of power capability and capacity. However, this reversible process becomes irreversible eventually.

Referring to FIG. 3, a soft internal short circuit occurs when the dendrites 64 extend through the separator pores and reach the cathode 54, as shown at location 66 in FIG. 3. A soft internal short circuit is challenging to detect as the battery cell 50 may continue to perform adequately in a voltage-based capability test. When the dendrites 64 penetrate the separator 60 permanently, a thermal runaway event may occur. Thermal runaway propagation occurs when a single cell enters thermal runaway, releases a large quantity of heat, and heats neighboring cells to the point of thermal runaway. Thermal runaway in a battery pack 12 is generally detected after it happens. The system 10 may predict cell issues prior to a thermal runaway condition. This provides additional time for mitigation and controls.

Figure 2:
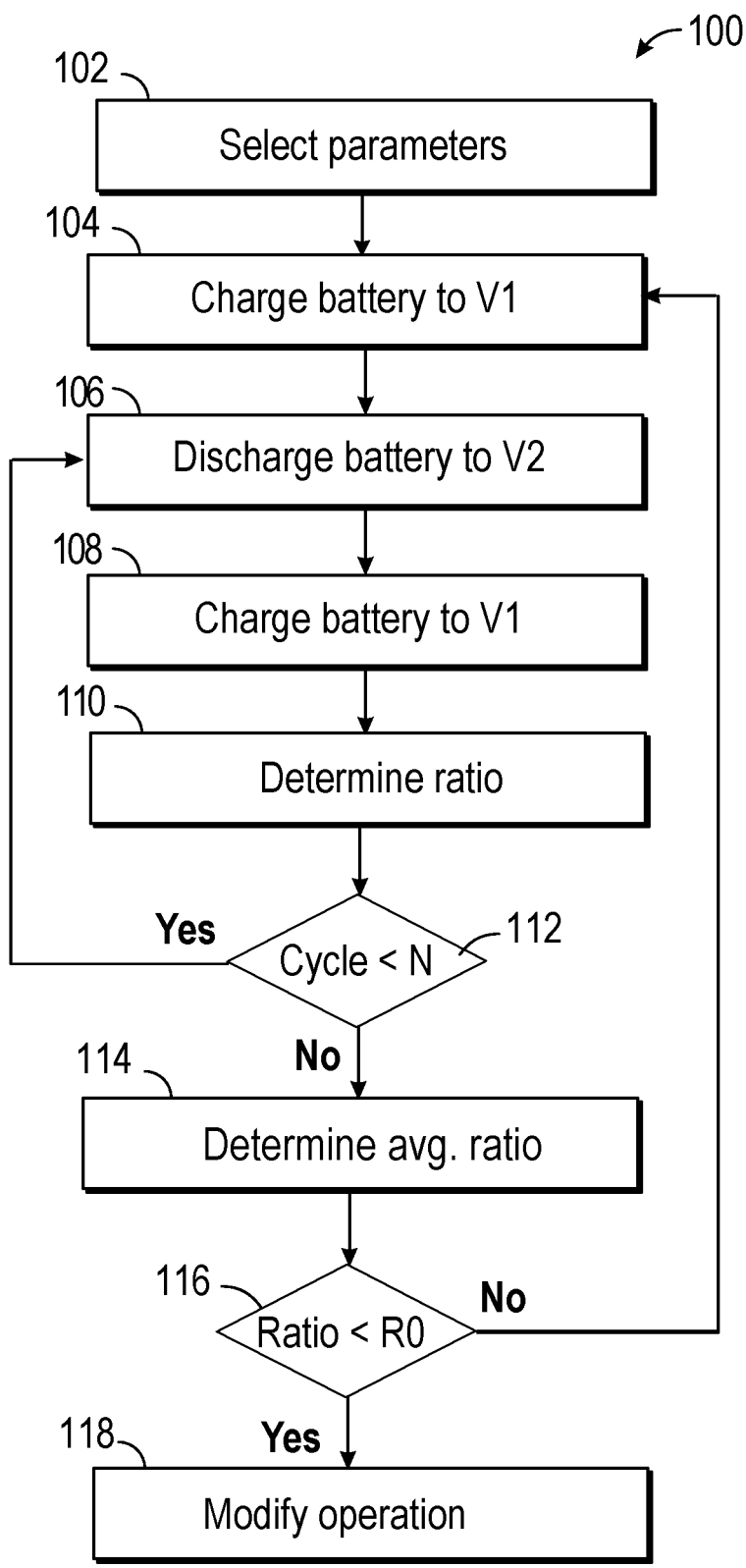
FIG. 2 is a schematic flow diagram of a method executable by the controller of FIG. 1.

Referring now to FIG. 2, a flowchart of the method 100 stored on and executable by the controller C of FIG. 1 is shown. Method 100 may be embodied as computer-readable code or instructions stored on and partially executable by the controller C of FIG. 1. Method 100 need not be applied in the specific order recited herein. Furthermore, it is to be understood that some steps may be eliminated.

The method 100 may be dynamically executed. As used herein, the terms 'dynamic' and 'dynamically' describe steps or processes that are executed in real-time and are characterized by monitoring or otherwise determining states of parameters and regularly or periodically updating the states of the parameters during execution of a routine or between iterations of execution of the routine.

Figure 4:
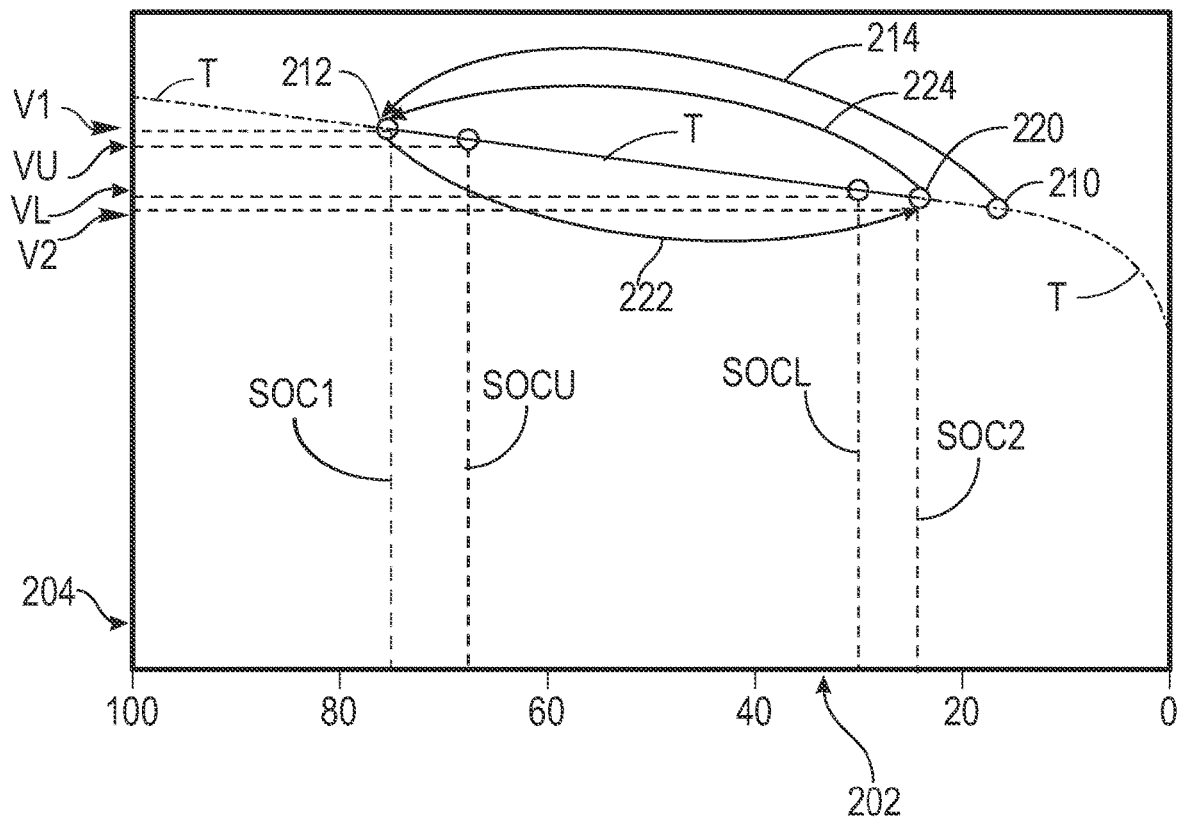
FIG. 4 is a schematic example of a graph illustrating battery state of charge on the horizontal axis, and battery voltage on the vertical axis.

Per block 102 of FIG. 2, the method 100 includes selecting parameters, such as an upper cut-off voltage ($V_U$) and a lower cut-off voltage ($V_L$), shown in FIG. 4. FIG. 4 is a schematic example of a trace T illustrating battery state of charge on the horizontal axis 202, and battery voltage on the vertical axis 204. As marked in FIG. 4, the battery state of charge on the horizontal axis 202 extends from 0% on the right end to 100% on the left end. The upper cut-off voltage ($V_U$) and a lower cut-off voltage ($V_L$) respectively correspond to an upper state of charge ($SOC_U$) and a lower state of charge ($SOC_L$). In one embodiment, the lower state of charge ($SOC_L$) is selected to be 70 percent and the upper state of charge ($SOC_U$) is selected to be 85 percent. In another embodiment, the difference ($\Delta SOC$) between the lower state of charge ($SOC_L$) and the upper state of charge ($SOC_U$) is set to be 5 percent.

Advancing to block 104, the method 100 includes charging the battery module 14 from an original state 210 to a first benchmark voltage 212 (see FIG. 4), via a first charging process 214 (see FIG. 4). The original state 210 is whatever voltage and state of charge that the module 14 happens to be in at that time. The first benchmark voltage ($V_1$) is greater than the upper cut-off voltage ($V_U$). In some embodiments, the first benchmark voltage ($V_1$) is selected to be within 5 percent of the respective value of the upper cut-off voltage ($V_U$). In one embodiment, the first benchmark voltage ($V_1$) is selected to be 1 percent greater than the upper cut-off voltage ($V_U$) such that ($V_1=1.01*V_U$). The variation in the voltage range takes into account cell to cell voltage variation, enabling screening of each of the battery cells 16 at the same time.

Proceeding to block 106, the method 100 includes discharging the battery module 14 from the first benchmark voltage 212 to a second benchmark voltage 220 (see FIG. 4), via a first discharging process 222 (see FIG. 4). The discharging process 222 may be achieved through running a vehicle application, such as a thermal system or auxiliary load. The discharging process 222 may be achieved through a vehicle-to-grid connection 28 and/or through a vehicle-to-vehicle connection 30 (see FIG. 1).

The second benchmark voltage ($V_2$) is less than the lower cut-off voltage ($V_L$). In some embodiments, the second benchmark voltage ($V_2$) is selected to be within 5 percent of the respective value of the lower cut-off voltage ($V_L$). In one embodiment, the second benchmark voltage ($V_2$) is selected to be 99 percent of the lower cut-off voltage ($V_L$) such that ($V_2=0.99*V_L$).

Advancing to block 108, the method 100 includes charging the battery module 14 from the second benchmark voltage ($V_2$) to the first benchmark voltage ($V_1$), via a second charging process 224 (see FIG. 4). The second charging process 224 may be achieved through a vehicle-to-grid connection 28 and/or through a vehicle-to-vehicle connection 30 (see FIG. 1). The discharging process 222 uses a first current ($I_d$) for a first duration. The second charging process 224 uses a second current ($I_C$) for a second duration. The first current may be selected to be equal to the second current, which provides an efficient calculation for coulombic efficiency. However, it is understood that the first current may be different from the second current. In one example, the first current is between about 3-50 Amperes.

Proceeding to block 110, the controller C is adapted to determine a discharging capacity and a charging capacity of the battery module 14 based in part on the first discharging process 222 and the second charging process 224, respectively. The discharging capacity ($C_D$) may be calculated as $C_D=[\int_{td1}^{td2} I_d dt]$, as the integration of the first current ($I_d$) over the first duration (from the start of the first discharging process 222 at time $t_{d1}$ to the end at time tai). The charging capacity ($C_C$) may be calculated as $C_C=[\int_{tc1}^{tc2} I_c dt]$ as the integration of the second current ($I_C$) over the second duration (from the start of the second charging process 224 at time $t_{C1}$ to the end at time $t_{C1}$). Additionally, the controller C is adapted to determine a coulombic efficiency ratio ($C_D/C_C$), referred to herein as ratio, of the discharging capacity to the charging capacity. A Kalman filter may be employed to reduce noise in the data.

Advancing to block 112, the controller C is adapted to determine if the first discharging process 222 and the second charging process 224 have occurred for a minimum number of cycles (N). The minimum number of cycles may be varied based on an operational power mode of the vehicle 22. For example, the minimum number of cycle may be selected to be three. If the number of cycles is less than the minimum number (block 112=YES), the method 100 loops back to block 106, repeating the first discharging process 222 and the second charging process 224.

If the number of cycles is at or above the minimum number (block 112=NO), the method 100 advances to block 114, where the controller C is adapted to modify the ratio to be an average value of the ratios for each of the cycles measured. Proceeding to block 116, the controller C is adapted to determine if the ratio (averaged over the cycles) is less than a predefined threshold. The predefined threshold may be calibrated for each vehicle 22 and battery pack 12. If not (block 114=NO), the method 100 may loop back to block 104 for further prognostic testing. If the ratio is less than a predefined threshold (R0) (block 114=YES), the method 100 proceeds to block 118 to determine if mitigating actions are required.

Per block 118, the controller C is adapted to control operation of the vehicle 22 based in part on the ratio obtained in block 114, including taking at least one remedial action if the ratio is less than the predefined threshold. The remedial action may include generating a diagnostic report as well as messaging service personnel and/or a fleet manager to perform servicing of the battery pack 12. The controller C may predict the likelihood of a thermal runway event based on the difference between the ratio and the predefined threshold.

The controller C may be adapted to diagnose an internal short malfunction (i.e., soft internal short circuit) when the ratio is less than the predefined threshold, and a voltage-based power capability of the battery module 14 is within an acceptable range. The controller C may be adapted to diagnose a non-internal short malfunction (i.e., not soft internal short circuit) when the ratio is less than the predefined threshold, and the voltage-based power capability is outside the acceptable range. The method 100 is then ended.

Referring to FIG. 1, the battery pack 12 may include a management unit 34 embedded with a microcircuit. The microcircuit may be an assembly of electronic components, with a core embodied by a microcontroller and including a wireless communication interface available to those skilled in the art. The microcircuit may include an associated memory, an associated processor, and an integrated electronic controls unit, such as an application-specific integrated circuit (ASIC). It is understood that the method works for both wire and wireless battery management systems.

The module management unit 34 is configured to store and/or measure parameters pertaining to the battery pack 12 as a whole or individual cells in the module. These parameters may include respective voltages, module current, module temperature, module state of charge, module capacity and cell state of charge. Thus, in the event one of the modules in the battery pack 12 needs servicing, a diagnostic scan tool or module repair tool may work directly with the module management unit 34 for service and refurbishing.

Referring to FIG. 1, a pack communicator 36 may be adapted to interface wirelessly with the module management unit 34 and the controller C, via a wireless network 38, which may be a short-range network or a long-range network. The short-range network may include, but is not limited to, a Controller Area Network (CAN), a Controller Area Network with Flexible Data Rate (CAN-FD).

In summary, the system 10 (via execution of method 100) enables detection of an internal-short malfunction and trigger mitigation control as early as possible. The system 10 covers diverse aging mechanisms, complex operating conditions, and cell-to-cell variation in a battery module 14.

The controller C of FIG. 1 includes a computer-readable medium (also referred to as a processor-readable medium), including a non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random-access memory (DRAM), which may constitute a main memory. Such instructions may be transmitted by one or more transmission media, including coaxial cables, copper wire and fiber optics, including the wires that comprise a system bus coupled to a processor of a computer. Some forms of computer-readable media include, for example, a floppy disk, a flexible disk, hard disk, magnetic tape, other magnetic medium, a CD-ROM, DVD, other optical medium, a physical medium with patterns of holes, a RAM, a PROM, an EPROM, a FLASH-EEPROM, other memory chip or cartridge, or other medium from which a computer can read.

Look-up tables, databases, data repositories or other data stores described herein may include various kinds of mechanisms for storing, accessing, and retrieving various kinds of data, including a hierarchical database, a set of files in a file system, an application database in a proprietary format, a relational database energy system (RDBMS), etc. Each such data store may be included within a computing device employing a computer operating system such as one of those mentioned above and may be accessed via a network in one or more of a variety of manners. A file system may be accessible from a computer operating system and may include files stored in various formats. An RDBMS may employ the Structured Query Language (SQL) in addition to a language for creating, storing, editing, and executing stored procedures, such as the PL/SQL language mentioned above.

The flowchart shown illustrates an architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It will also be noted that each block of the block diagrams and/or flowchart illustrations, and combinations of blocks in the block diagrams and/or flowchart illustrations, may be implemented by specific purpose hardware-based systems that perform the specified functions or acts, or combinations of specific purpose hardware and computer instructions. These computer program instructions may also be stored in a computer-readable medium that can direct a controller or other programmable data processing apparatus to function in a particular manner, such that the instructions stored in the computer-readable medium produce an article of manufacture including instructions to implement the function/act specified in the flowchart and/or block diagram blocks.

The numerical values of parameters (e.g., of quantities or conditions) in this specification, including the appended claims, are to be understood as being modified in each respective instance by the term "about" whether or not "about" actually appears before the numerical value. "About" indicates that the stated numerical value allows some slight imprecision (with some approach to exactness in the value; about or reasonably close to the value; nearly). If the imprecision provided by "about" is not otherwise understood in the art with this ordinary meaning, then "about" as used herein indicates at least variations that may arise from ordinary methods of measuring and using such parameters. In addition, disclosure of ranges includes disclosure of each value and further divided ranges within the entire range. Each value within a range and the endpoints of a range are hereby disclosed as separate embodiments.

The detailed description and the drawings or FIGS. are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings, or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

What is claimed is:

1. A method for monitoring a battery module in a vehicle having a controller with a processor and tangible, non-transitory memory, the method comprising:
   selecting an upper cut-off voltage and a lower cut-off voltage;
   charging the battery module from an original state to a first benchmark voltage, via a first charging process, the first benchmark voltage being greater than the upper cut-off voltage;
   discharging the battery module from the first benchmark voltage to a second benchmark voltage, via a first discharging process, the second benchmark voltage being less than the lower cut-off voltage;
   charging the battery module from the second benchmark voltage to the first benchmark voltage, via a second charging process;
   determining a discharging capacity and a charging capacity of the battery module based in part on the first discharging process and the second charging process, respectively;
   obtaining a ratio of the discharging capacity to the charging capacity, via the controller;
   controlling operation of the vehicle based in part on the ratio, including taking at least one remedial action if the ratio is less than a predefined threshold, the predefined threshold being calibrated for the vehicle and the battery module; and
   wherein the at least one remedial action includes messaging service personnel and/or a fleet manager to perform servicing of the battery pack.

2. The method of claim 1, further comprising:
   using a first current for a first duration in the first discharging process, and using a second current for a second duration in the second charging process; and
   selecting the second current to be equal to the first current.

3. The method of claim 1, further comprising:
   selecting the first benchmark voltage ($V_1$) to be about 1 percent greater than the upper cut-off voltage ($V_U$) such that ($V_1=1.01*V_U$); and
   selecting the second benchmark voltage ($V_2$) to be about 99 percent of the lower cut-off voltage ($V_L$) such that ($V_2=0.99*V_L$).

4. The method of claim 3, wherein the upper cut-off voltage and the lower cut-off voltage respectively correspond to an upper state of charge and a lower state of charge, the method further comprising:
   selecting the lower state of charge to be 5 percent less than the upper state of charge.

5. The method of claim 1, further comprising:
   selecting the at least one remedial action to include messaging service personnel and/or fleet manager.

6. The method of claim 1, further comprising:
   repeating the first discharging process and the second charging process for at least three respective cycles; and
   modifying the ratio to be an average of the discharging capacity divided by the charging capacity for the at least three respective cycles.

7. The method of claim 1, further comprising:
   diagnosing an internal-short malfunction when the ratio is less than the predefined threshold, and a voltage-based power capability is within an acceptable range; and
   diagnosing a non-internal-short malfunction when the ratio is less than the predefined threshold, and the voltage-based power capability is outside the acceptable range.

8. The method of claim 1, further comprising:
   executing the first discharging process through a vehicle-to-grid connection and/or a vehicle-to-vehicle connection.

9. The method of claim 8, further comprising:
   executing the first discharging process and the second charging process while the vehicle is in a parking mode.

10. The method of claim 8, further comprising:
    executing the first discharging process and the second charging process while the vehicle is in a driving mode.

11. A method for monitoring a battery module in a vehicle having a controller with a processor and tangible, non-transitory memory, the method comprising:
    selecting an upper cut-off voltage and a lower cut-off voltage;

charging the battery module from an original state to a first benchmark voltage, via a first charging process, the first benchmark voltage being within 5 percentage of a respective value of the upper cut-off voltage, the first benchmark voltage being greater than the upper cut-off voltage;

discharging the battery module from the first benchmark voltage to a second benchmark voltage, via a first discharging process, using a first current for a first duration, the second benchmark voltage being within 5 percentage of the respective value of the lower cut-off voltage, the second benchmark voltage being less than the lower cut-off voltage;

charging the battery module from the second benchmark voltage to the first benchmark voltage, via a second charging process, using a second current for a second duration;

determining a discharging capacity and a charging capacity of the battery module based in part on the first discharging process and the second charging process, respectively;

obtaining a ratio of the discharging capacity to the charging capacity, via the controller;

controlling operation of the vehicle based in part on the ratio, including taking at least one remedial action if the ratio is less than a predefined threshold, the predefined threshold being calibrated for the vehicle and the battery module; and wherein the at least one remedial action includes generating a diagnostic report.

12. The method of claim 11, further comprising:
selecting the first current to be equal to the second current.

13. The method of claim 11, further comprising:
selecting the first benchmark voltage ($V_1$) to be about 1 percent greater than the upper cut-off voltage ($V_U$) such that ($V_1=1.01*V_U$); and
selecting the second benchmark voltage ($V_2$) to be about 99 percent of the lower cut-off voltage ($V_L$) such that ($V_2=0.99*V_L$).

14. The method of claim 11, further comprising:
selecting the at least one remedial action to include messaging service personnel and/or a fleet manager.

15. The method of claim 11, further comprising:
repeating the first discharging process and the second charging process respectively for a plurality of cycles exceeding a minimum number; and
modifying the ratio to be an average of the discharging capacity divided by the charging capacity for the plurality of cycles.

16. The method of claim 15, further comprising:
selecting the minimum number of the plurality of cycles to be three.

17. The method of claim 11, wherein the upper cut-off voltage and the lower cut-off voltage respectively correspond to an upper state of charge and a lower state of charge, the method further comprising:
selecting the lower state of charge to be within 5 percent of the upper state of charge.

18. The method of claim 11, further comprising:
diagnosing an internal-short malfunction when the ratio is less than the predefined threshold, and a voltage-based power capability is within an acceptable range; and
diagnosing a non-internal-short malfunction when the ratio is less than the predefined threshold, and the voltage-based power capability is outside the acceptable range.

19. A system for monitoring a battery module in a vehicle, the system comprising:
a controller having a processor and tangible, non-transitory memory on which instructions are recorded, the controller being configured to:
select an upper cut-off voltage and a lower cut-off voltage;
command charging of the battery module from an original state to a first benchmark voltage, via a first charging process, the first benchmark voltage being greater than the upper cut-off voltage;
command discharging of the battery module from the first benchmark voltage to a second benchmark voltage, via a first discharging process, the second benchmark voltage being less than the lower cut-off voltage;
command charging of the battery module from the second benchmark voltage to the first benchmark voltage, via a second charging process;
determine a discharging capacity and a charging capacity of the battery module based in part on the first discharging process and the second charging process, respectively;
obtain a ratio of the discharging capacity to the charging capacity, via the controller;
control operation of the vehicle based in part on the ratio, including taking at least one remedial action if the ratio is less than a predefined threshold;
wherein the at least one remedial action includes messaging service personnel and/or a fleet manager to perform servicing of the battery pack; and
wherein the predefined threshold is calibrated for the vehicle and the battery module.

20. The system of claim 19, wherein the first benchmark voltage ($V_1$) is about 1 percent greater than the upper cut-off voltage ($V_U$) such that ($V_1=1.01*V_U$), and the second benchmark voltage ($V_2$) is about 99 percent of the lower cut-off voltage ($V_L$) such that ($V_2=0.99*V_L$).

* * * * *